United States Patent

Dexter et al.

[11] 4,071,497
[45] Jan. 31, 1978

[54] HINDERED HYDROXYPHENYLALKANOATES OF THIOETHER ISOPROPANOLS AND STABILIZED COMPOSITIONS

[75] Inventors: Martin Dexter, Briarcliff Manor; David Herbert Steinberg, Bronx, both of N.Y.

[73] Assignee: Ciba-Geigy Corporation, Ardsley, N.Y.

[21] Appl. No.: 649,007

[22] Filed: Jan. 14, 1976

Related U.S. Application Data

[62] Division of Ser. No. 532,127, Dec. 12, 1974, Pat. No. 3,954,839.

[51] Int. Cl.² .............................................. C08K 5/37
[52] U.S. Cl. ........................ 260/45.85 B; 260/609 F; 260/45.85 S
[58] Field of Search ...................................... 260/45.85

[56] References Cited

U.S. PATENT DOCUMENTS 3,285,855 11/1966 Dexter et al. ................... 260/45.85S

FOREIGN PATENT DOCUMENTS 1,436,393 3/1966 France.

Primary Examiner—V. P. Hoke
Attorney, Agent, or Firm—Luther A. R. Hall

[57] ABSTRACT

The compounds are esters having the formula

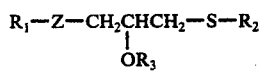

wherein
$R_1$ and $R_2$ are each independently alkyl, cycloalkyl, alkylthioethyl or alkylpolyoxyalkylene, Z is oxygen or sulfur, $R_3$ is the group

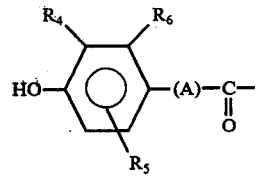

$R_4$ is hydrogen, alkyl, cycloalkyl or α-methylbenzyl, $R_5$ is alkyl or cycloalkyl, $R_6$ is hydrogen or alkyl and, provided when $R_4$ is hydrogen, $R_6$ is alkyl and $R_5$ is located on the carbon atom ortho to the hydroxyl group, and A is a covalent carbon bond or lower alkylene.

The esters of this invention are prepared by usual esterification procedures from a thioether isopropanol and an acid of formula

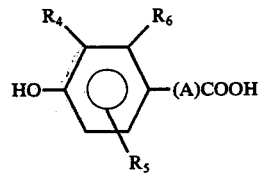

or a derivative thereof, preferably the methyl ester.

The thioether isopropanols are prepared by reaction of epichlorohydrin with an alcohol or mercaptan followed by the opening of the oxirane ring with a mercaptide to give the desired thioether isopropanol.

The compounds are useful as stabilizers for organic materials, especially polyolefins, which degrade upon exposure to light and heat.

12 Claims, No Drawings

HINDERED HYDROXYPHENYLALKANOATES OF THIOETHER ISOPROPANOLS AND STABILIZED COMPOSITIONS

This is a divisional of application Ser. No. 532,127 filed on Dec. 12, 1974, now U.S. Pat. No. 3,954,839, issued May 4, 1976.

This invention pertains to substituted thioether isopropanol esters of hindered hydroxyphenylalkanoic acids and to organic materials normally subject to oxidative, thermal and UV light degradation stabilized with said ester compounds.

More specifically the compounds of this invention are those having the formula

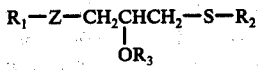

wherein $R_1$ and $R_2$ are each independently alkyl of 1 to 30 carbon atoms, cycloalkyl of 5 to 12 carbon atoms, alkylthioethyl of 4 to 27 atoms in the chain or alkylpolyoxyalkylene of 4 to 27 atoms in the chain, Z is oxygen or sulfur, $R_3$ is the group

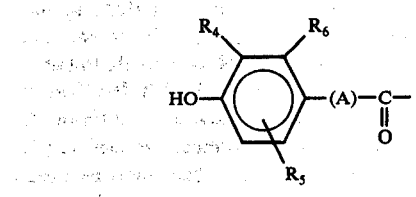

$R_4$ is hydrogen, alkyl of 1 to 8 carbon atoms, cycloalkyl of 5 to 6 carbon atoms or α-methylbenzyl, $R_5$ is alkyl of 1 to 8 carbon atoms or cycloalkyl of 5 to 6 carbon atoms, $R_6$ is hydrogen or lower alkyl of 1 to 4 carbon atoms, or $R_4$ and $R_6$ together are a butylene chain which, together with the phenyl ring, form a tetrahydronaphthyl group, and provided when $R_4$ is hydrogen, $R_6$ is alkyl and $R_5$ is located on the carbon atom ortho to the hydroxyl group, and A is a covalent carbon bond or a straight or branched lower alkylene having 1 to 8 carbon atoms.

The $R_1$ and $R_2$ groups can be alkyl of 1 to 30 carbon atoms such as methyl, n-butyl, n-octyl, t-dodecyl, n-octadecyl, n-tetracosanyl or n-triacontanyl. Preferably $R_1$ and $R_2$ are each independently alkyl of 1 to 18 carbon atoms, such as methyl, n-butyl, n-dodecyl or n-octadecyl. Most preferably for use in stabilizing polyolefins such as polypropylene, polyethylene and olefin copolymer $R_1$ and $R_2$ are each independently alkyl of 8 to 18 carbon atoms.

The $R_1$ and $R_2$ groups can be cycloalkyl of 5 to 12 carbon atoms such as cyclopentyl, cyclohexyl or cyclododecyl.

$R_1$ and $R_2$ are also alkylthioethyl of 4 to 27 atoms in the chain such as 2-methylthioethyl, 2-(n-octylthio)ethyl and 2-(tetracosanylthio)ethyl.

$R_1$ and $R_2$ can also be alkylpolyoxyalkylene of 4 to 27 atoms in the chain having the general structure $R°(OC_nH_{2n})_h$ or $R°(OCH_2CHR')_h$ where $R°$ is alkyl of 1 to 18 carbon atoms, $n$ is 2 to 4, $R'$ is hydrogen, methyl or ethyl and $h$ is 1 to 3.

The $R_4$ and $R_5$ groups can be straight or branched lower alkyl groups, having 1 to 8 carbon atoms as for example, methyl, ethyl, isopropyl, n-butyl, tert-butyl, tert-amyl or n-octyl. $R_4$ and $R_5$ can also be cycloalkyl of 5 to 6 carbon atoms such as cyclopentyl or cyclohexyl. $R_4$ can also be α-methylbenzyl.

Preferably $R_5$ is a branched alkyl of 3 to 8 carbon atoms, such as isopropyl, sec-butyl, tert-butyl, sec-amyl, tert-amyl, sec-octyl or tert-octyl. Most preferably $R_5$ is tert-butyl.

Preferably $R_4$ is a straight or branched alkyl group of 1 to 4 carbon atoms, such as methyl, ethyl, isopropyl or tert-butyl. Most preferably $R_4$ is methyl or tert-butyl.

Preferably $R_6$ is hydrogen or alkyl of 1 to 3 carbon atoms, such as methyl, ethyl or n-propyl. Most preferably $R_6$ is hydrogen or methyl.

A can be a straight or branched lower alkylene of 1 to 8 carbon atoms such as methylene, ethylene, 2,3-propylene, trimethylene, 1,1-dimethylethylene, 1,1-butylidene, 2-methyl-1,1-propylidene or 1,1-octylidene. Preferably A is a straight chain alkylene of 1 to 3 carbon atoms, that is, methylene, ethylene or trimethylene. Most preferably A is methylene or ethylene. A can also be a covalent carbon bond.

The esters of this invention are prepared by usual esterification procedures from the appropriate substituted 2-propanol and an acid of the formula I

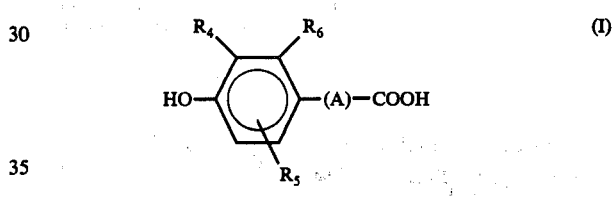

an acid halide or acid anhydride thereof or from the corresponing lower alkyl, preferably methyl, ester.

The acid halide derivatives of the above cited acids are made in a conventional manner using standard halogenating agents such as thionyl chloride, phosphorus trichloride and phosphorus oxychloride.

The lower alkyl esters, usually methyl, are conveniently made by an acid catalyzed reaction of the above-cited acid with a lower alcohol, such as methanol.

Where A is ethylene or substituted ethylene, the lower alkyl esters are conveniently made by reaction of a substituted phenol (II) with an acrylate ester as represented below.

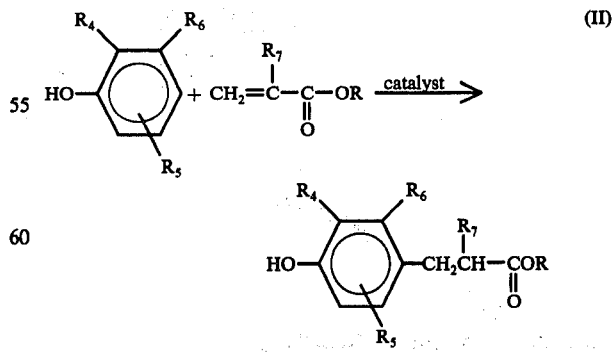

where $R_7$ is hydrogen or lower alkyl of 1 to 6 carbon atoms and R is alkyl of 1 to 4 carbon atoms. Processes of this type are disclosed for example in U.S. Pat. No.

3,247,240 (Apr. 9, 1966) and U.S. Pat. No. 3,364,250 (Jan. 16, 1968).

The above-described ester intermediates may also be made by reacting a substituted phenol with an acrylonitrile as represented below.

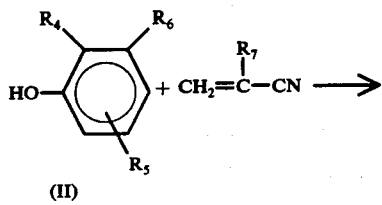

This reaction is analogous to that disclosed in U.S. Pat. No. 3,121,732 (Feb. 18, 1964).

The acids where A is methylene are conveniently made by the sequence below

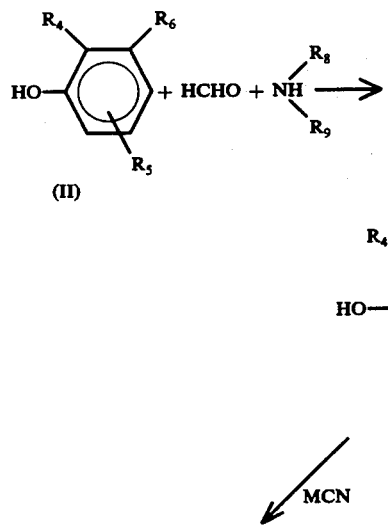

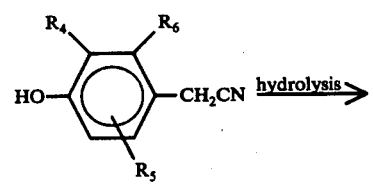

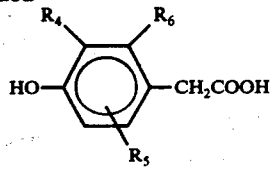

where M is an alkali metal such as sodium or potassium and $R_8$ and $R_9$ are lower alkyl of 1 to 8 carbon atoms or together form a morpholine or piperidine ring with the nitrogen atom. Preferably $R_8$ and $R_9$ are methyl.

Substitution of higher aldehydes such as n-butanal or n-octanal for formaldehyde in the reactions outlined in the previous paragraph leads to the preparation of acids of formula (I) where A is 1,1-alkylidene.

Acids of formula I can also be prepared by reaction of substituted phenolate anions with appropriate halogenoalkane carboxylate esters, amides or nitriles where A may be straight or branched alkylene of 2 to 8 carbon atoms.

Most of the di- and trialkylated phenols (II) contemplated for use as starting materials to make the compounds of this invention are known compounds which are available commercially. The preparation of 2,6-diisopropyl-3-methylphenol and 2,6-di-tert-butyl-3-methylphenol is disclosed in Japanese patent application 7015,491. The preparation of 2,3-dimethyl-6-tert-butylphenol is disclosed by G. Parc, Revue de L'Institut Francais du Petrole, XV, 693 (1960). Other substituted phenols may be made by the selected alkylation of phenolic starting materials using acid catalysis such as ptoluene sulfonic acid and selected olefins such as propylene, isobutylene and 2,4,4-trimethylpentene-1.

Although $R_5$ may be either ortho to the hydroxyl group or the A group, preferably $R_5$ is ortho to the hydroxyl in esters of this invention.

Substituted 2-propanol intermediates are reacted with the hindered phenolalkanoic acid derivatives described previously to prepare the esters of this invention as seen below.

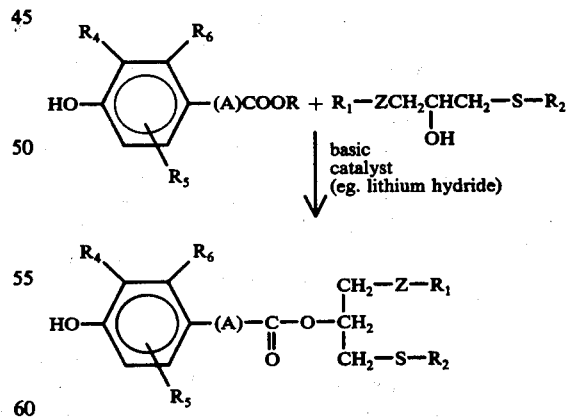

The key substituted 2-propanol intermediates required to prepare the esters of this invention are made by several methods.

Most conveniently they may be made by reacting first epichlorohydrin with an alcohol or mercaptan in the presence of a base followed by a second reaction with a mercaptan under alkaline conditions.

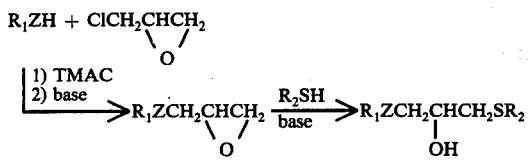

Where Z is oxygen, an alternate sequence of reactions may be followed involving preparation of an allyl ether, oxidation of the allyl moiety to the corresponding oxirane and opening the oxirane ring with a mercaptide to form the substituted 2-propanol.

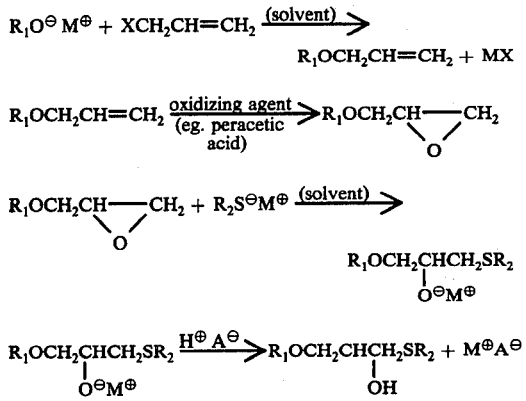

where X is halogen, M+ is a cation such as lithium, sodium, potassium or ammonium, A− is an anion such as chloride, bromide or acetate, solvent may be optional and the oxidizing agent is a peracid such as peracetic acid.

These substituted 2-propanols are new compounds in their own right useful as chemical intermediates in the preparation of stabilizers of this invention and a myriad of other products such as synergists, extreme pressure additives for lubricants, pesticides, fuel additives and the like.

The esters of this invention exhibit excellent stabilization activity in polypropylene even in the absence of a thio ester co-stabilizer such as distearyl β-thiodipropionate (DSTDP). With the addition of DSTDP co-stabilizer, the stabilization protection afforded polypropylene by the esters of this invention is surprising high, far exceeding in most cases that provided in similar formulations by commercial stabilizers of choice.

This is particularly surprising and economically important for the esters of the present invention exhibit this superior degree of stabilization even though the molar concentration of the active hindered phenol moiety from the ester stabilizer of this invention is polypropylene is only about two-thirds of the molar concentration of hindered phenol moiety in polypropylene when commercial stabilizers of choice are used. That superior stabilization can be afforded with a significantly lower amount of the relatively expensive hindered phenol moiety is of great economic importance.

It is understood that the scope of the invention is not limited by the following postulations nor that the stabilization effectiveness of the esters of this invention necessarily results from the proposed explanations thereof or by the schematic representations presented. Although the reason for this particularly effective stabilization activity of the esters of this invention is unknown, it is theorized that the molecular structure of these esters must in some way permit a more efficacious utilization of the hindered phenol part of the molecules in the polypropylene system allowing less of the hindered phenol to perform the necessary stabilization function.

While the liquid physical nature of these esters may well facilitate their introduction and compatibilization in the amorphous areas of the polypropylene system where stabilization activity is most needed, it is postulated that the molecular structure of the esters is significantly different from the prior art stabilizers and that this difference in structure may well account for the great effectiveness of the esters of this invention.

These esters are all derived from substituted isopropanols having preferably either one long alkyloxy and one long alkylthio groups in the 1 and 3 positions or two long alkylthio groups at the 1 and 3 positions when used to stabilize polyolefins. Thus the esters of this invention have two solubilizing hydrocarbon substituents going in opposite directions with the active hindered phenol moiety centrally located therebetween to effect a particularly active and efficient stabilization of polypropylene.

The prior art stabilizers are of four general types all differing significantly from the instant esters. In Type 1 a plurality of hindered phenol moieties surround a small hydrocarbon linking group. These materials are generally solids and relatively high melting materials with concomitant limited solubility in aliphatic hydrocarbon solvents. One member of this group 1,1,1-butanetriyl tris [3-(3,5-di-tert-butyl-4-hydroxyphenyl)propionate] (Example 7, U.S. Pat. No. 3,285,855) did exhibit very good stabilization activity at the 0.5% level in polypropylene at a high molar concentration of hindered phenol moiety and with a small solubilizing hydrocarbon chain (n-propyl) attached thereto. The instant compounds exhibit far better stabilization activity at lower molar concentrations. See U.S. Pat. No. 3,644,482.

In Type 2, the hindered phenol moiety is joined by a single long hydrocarbon chain sometimes containing a heteroatom such as sulfur. (See U.S. Pat. Nos. 3,330,859, 3,441,575).

In Type 3, two hindered phenol moieties are attached to an alkylene chain sometimes containing a heteroatom such as sulfur. (See U.S. Pat Nos. 3,644,482).

In Type 4, mixed esters derived from a hindered phenolalkanoic acid and a mixture of alkyl substituted alkanediols result in liquid stabilizers having two hindered phenol moieties attached to an alkylene chain substituted with pendant lower alkyl groups (See U.S. Pat. No. 3,779,945).

A comparison of the test data on the best ester compounds of Types 1–4 described above and given in U.S. Pat. No. 3,285,855, U.S. Pat. No. 3,758,549 and U.S. Pat. No. 3,779,945 with test data on the esters of the present invention is given in Example 7, Table I. The esters of this invention at only 40% the concentration of the best prior art esters exhibit superior stabilization effectiveness in polypropylene. The less additive required in a plastic usually benefits retention of its physical properties.

Schematically these types of stabilizers may be represented below where + represents a hindered phenolic moiety, and — a short linking chain or pendant group and ⌇ a long solubilizing hydrocarbon chain which may include a heteroatom such as oxygen or sulfur therein.

A comparison of these schematic models clearly indicates that the esters of the present invention are structurally and configurationally different and are not anticipated or suggested by the prior art compounds.

Type 1
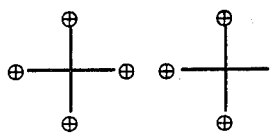

Type 2
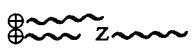

Type 3
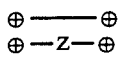

Type 4
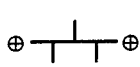

Esters of this invention
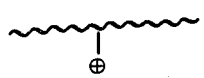

The substrates of particular importance are olefin polymers such as polyethylene, polypropylene, olefin copolymers and blends thereof. Polypropylene is especially well stabilized with the compounds of this invention.

The stabilizers of this invention are particularly useful in protecting polymer compositions subjected to high temperature processing as well as end uses involving elevated temperature. Polymer compositions containing these stabilizers where $R_4$ is methyl, $R_5$ is tert-butyl and $R_6$ is hydrogen or methyl tend to be particularly resistant to discoloration in the presence of antistatic agents, detergents and polymerization catalyst residues.

Polymer compositions, particularly polypropylene, containing the esters of this invention where Z is sulfur are surprisingly light stable compared to compositions containing many high performance prior art antioxidants. This surprising observation distinguishes the esters of this invention and provides these esters with particular utility.

The ester compounds of the present invention provide excellent stabilization protection not only for polymeric substrates such as polyolefins, polyacetals, polyesters and polyamides, but also for non-polymeric substances such as oils which undergo thermal and actinic degradation.

For many purposes, it is convenient or even necessary that the stabilizer additive be a solid, preferably white, somewhat high melting material. This is especially true for polymeric substrates where small amounts of the additive are to be isolated then weighed accurately and added discretely into the polymeric system to be stabilized.

The compounds of the instant invention provide an equally beneficial physical form for such stabilizers are essentially colorless, high boiling liquids. These materials are stable, possess the requisite structures for enhancing solubility and compatibility in the substrates to be stabilized and provide by their totally liquid nature, as contrasted to a high-melting solid or a low-melting semi-solid, a particularly convenient method of addition to the substrate systems. The compounds of this invention can be accurately metered and monitored into the substrate systems to be stabilized using standard liquid pumping devices.

The esters of the invention are expected to find particular utility in stabilizing liquid substrates such as oils and in stabilizing polymeric substrates where liquid pumping devices can be expeditiously employed in adding the stabilizers during polymer processing.

The hindered hydroxyphenyl alkanoates of this invention are stabilizers of organic material normally subject to thermal and oxidative deterioration. Materials which are thus stabilized include synthetic organic polymeric substances such as poly-α-olefins, polyethylene, polypropylene, crosslinked polyethylene, polybutylene including copolymers of α-olefins such as ethylene/propylene copolymer; dienes such as polybutadiene, polyisoprene, and the like, including copolymers with other monomers; polyurethanes and polyamides such as polyhexamethylene adipamide and polycaprolactam; polyesters such as polyethylene terephthalates; polycarbonates; polyacetals; unsaturated polyesters; polystyrene, polyethylene oxide; and copolymers such as those of high impact polystyrene containing copolymers of butadiene and styrene and those formed by the copolymerization of acrylonitrile, butadiene and/or styrene, ABS; SAN; natural and synthetic rubbers such as ethylene/propylene/diene copolymer (EPDM) and chlorinated rubber; polyphenylene oxide and copolymers; vinyl resins formed from the polymerization of vinyl halides or from the co-polymerization of vinyl halides with unsaturated polymerizable of vinyl halide with unsaturated polymerizable compounds, e.g., vinyl esters, α, β-unsaturated ketones, α, β-unsaturated aldehydes and unsaturated hydrocarbons such as butadienes and styrene; and plasticized polyvinyl chloride.

Other materials which can be stabilized by the compounds of the present invention include lubricating oil of the aliphatic ester type, i.e., di(2-ethylene) azelate and other synthetic ester lubricants, pentaerythritol tetracaproate, and the like, spinning lubricants of the polyester type; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, mineral lube oils, cutting fluids, waxes, resins and the like, salts of fatty acids such as soaps and the like; and alkylene glycols, e.g., β-methoxyethylene glycol, methoxytriethylene glycol, triethylene glycol, octaethylene glycol, dibutylene glycol, dipropylene glycol and the like.

The substrates of particular importance are olefin polymers such as polyethylene, polypropylene, polybutylene and ethylene/vinyl acetate. Polypropylene is especially well stabilized with the compounds of this invention.

In general, the stabilizers of this invention are employed from about 0.01 to about 5% by weight of the stabilized compositions, although this will vary with the particular substrate and application. An advantageous range is from about 0.05 to about 2% and especially from about 0.1 to about 1%.

For addition to polymeric substrates, the stabilizers can be blended before polymerization or after polymerization, during the usual processing operations, for example, by dry blending, extruder compounding and hot-milling. The composition then can be extruded, pressed, injected molded or otherwise fabricated into films, fibers, filaments, molded items and the like. The heat stabilizing properties of these compounds advantageously stabilize the polymer against degradation during such processing at the high temperature generally encountered. However, the useful life of polymeric materials is also extended by these stabilizers far beyond their ability to survive processing.

The stabilizers can also be dissolved in suitable solvents and sprayed on the surface of films, fabrics, filaments or the like to provide effective stabilization.

These compounds can also be used in combination with other additives such as sulfur-containing esters, e.g., distearyl β-thiodipropionate (DSTDP) in an amount of from 0.01 to 2% by weight of the organic material, and the like, pourpoint depressants, corrosion and rust inhibitors, dispersing agents, emulsifiers, antifoaming agents, carbon black, accelerators and other chemicals used in rubber compounding, plasticizers, color stabilizers, antistatic agents, antislip agents, antiblock agents, surface active agents, fillers, organophosphites, organothiophosphites, heat stabilizers, ultraviolet light stabilizers, antiozonants, dyes, pigments, metal deactivators, metal chelating agents, dyesites and the like. Often combinations such as these, particularly the sulfur containing esters, the phosphites and/or the ultraviolet light stabilizers will produce superior results in certain applications to those expected by the properties of the individual components.

The following formula represents co-stabilizers which are in certain instances very useful in combination with the stabilizers of this invention:

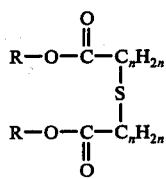

wherein R is an alkyl group having from 6 to 24 carbon atoms; and $n$ is an integer 1 to 6. Especially useful compounds of this type are dilauryl β-thiodipropionate and distearyl β-thiodipropionate. The above co-stabilizers are used in the amount of from 0.01 to 2% by weight of the organic material, and preferably from 0.1 to 1%.

In addition to the above noted additives that can be employed in combination with the compounds of this invention, it is often especially advantageous to employ also light stabilizers. The light stabilizers are used in the amount of from 0.01 to 5% by weight of the organic material, and preferably from 0.1 to 1%. Illustrative examples of light stabilizers are listed below.

UV-ABSORBERS AND LIGHT PROTECTION AGENTS 2-(2'-hydroxyphenyl)-2H-benztriazoles, such as, for example, the 5'-methyl-, 3',5'-di-tert.-butyl-, 5'-tert.-butyl-, 5'-(1,1,3,3-tetramethylbutyl)-, 5-chloro-3', 5'-di-tert.-butyl-, 5-chloro-3'-tert.-butyl-5'-methyl-,3'-sec.-butyl-5'-tert.-butyl-, 3'-{α-methyl-benzyl}-5'methyl-, 3'-{α-methylbenzyl}-5'-methyl-5-chloro-, 4'-hydroxy-, 4'-methoxy-, 4'-octoxy-, 3',5'-di-tert.-amyl-, 3'-methyl-5'-carbomethoxyethyl-5-chloro-3',5'-di-tert.-amyl-or 4'-tert-octyl- derivatives.

2,4-bis-(2'-hydroxyphenyl)-6-alkyl-s-triazines, such as for example, the 6-ethyl-, 6-undecyl- or 6-heptadecyl- derivatives.

2-hydroxybenzophenones, such as, for example, the 4-hydroxy-, 4-methoxy-, 4-octoxy, 4-decyloxy, 4- dodecyloxy-, 4-benzyloxy-, 4,2',4'-trihydroxy- or 2'-hydroxy-4,4'-dimethoxy- derivatives.

1,3-bis-(2'-hydroxybenzoyl)benzenes, such as, for example, 1,3-bis-(2'-hydroxy-4'-hexyloxybenzoyl)-benzene, 1,3-bis-(2'-hydroxy-4'-octoxybenzoyl)benzene and 1,3-bis-(2'-hydroxy-4'-dodecyloxybenzoyl)benzene.

Esters of optionally substituted benzoic acids, such as, for example, phenyl salicylate, octylphenyl salicylate, dibenzoylresorcinol, bis-(4-tert.-butylbenzoyl)-resorcinol, benzoylresorcinol, 3,5-di-tert.-butyl-4-hydroxybenzoic acid 2,4-di-tert.-butylphenyl ester, octadecyl ester or 2-methyl-4,6-di-tert.-butylphenyl ester, and the alkyl esters of 4-(3,5-di-tert-butyl-. 4-hydroxybenzoyloxy)-3,5-di-tert-butylbenzoic acid.

Acrylates, such as, for example, α-cyano-β,β-diphenylacrylic acid ethyl ester or isooctyl ester, α-carbomethoxycinnamic acid methyl ester, α-cyano-β-methyl-p-methoxycinnamic acid methyl ester or butyl ester and N-(β-carbomethoxy-vinyl)-2-methylindoline.

Nickel compounds, such as, for example, nickel complexes of 2,2'-thio-bis-4-(1,1,3,3-tetramethylbutyl)-phenol, such as the 1:1 and 1:2 complex, optionally with other ligands such as n-butyl-, triethanol-, cyclohexyl- or N-cyclohexyldiethanolamine; nickel complexes of bis-{2-hydroxy-4-(1,1,3,3-tetramethylbutyl)phenyl}sulfone, such as the 2:1 complex, optionally with other ligands such as 2-ethylcaproic acid; nickel dibutyldithiocarbamate, nickel salts of 4-hydroxy-3,5-di-tert.-butylbenzylphosphonic acid monoalkly esters, such as the methyl, ethyl or butyl esters, the nickel complex of (2-hydroxy-4-methylphenyl) undecylketonoxime and nickel 3,5-di-tert.-butyl-4-hydroxybenzoate.

Oxalic acid diamides, such as, for example, 4,4'-dioctyloxyoxanilide, 2,2'-dioctyloxy-5,5'-di-tert.-butyloxanilide, 2,2'-didodecyloxy-5,5'-di-tert-butyloxanilide, 2-ethoxy-5-tert-butyl-2'-ethyloxanilide, 2-ethoxy-2'-ethyloxanilide, N,N'-bis-(3-dimethylaminopropyl)oxalamide, mixtures of o- and p-methoxy and o- and p-ethoxy-di-substituted oxanilides and mixtures of 2-ethoxy-5-tert.-butyl-2'-ethyloxanilide with 2-ethoxy-2'ethyl-5,4'-di-tert.-butyloxanilide.

Sterically hindered amines, such as, for example 4-benzoyloxy-2,2,6,6-tetramethylpiperidine, 4-stearoyloxy 2,2,6,6-tetramethylpiperidine, bis-(2,2,6,6-tetramethylpiperidyl) sebacate and 3-n-octyl-7,7,9,9-tetramethyl-1,3,8-triazaspiro [4,5] decan-2,4-dione.

For exemplification purposes only listed below are compounds of this invention which are useful as stabilizers as discussed above.

1-n-hexadecyloxy-3-n-octadecylthio-2-propyl 3-(3,5-di-tertbutyl-4-hydroxyphenyl)propionate 1,3-bis(n-octadecylthio)-2-propyl 3,5-di-tert-butyl-4-hydroxyphenylacetate 1-n-dodecyloxy-3-n-hexadecylthio-2-propyl 2,3-dimethyl-4-tertbutyl-4-hydroxyphenylacetate 1,3-bis(cyclohexylthio)-2-propyl 3-(3-methyl-5-tert-butyl-4-hydroxyphenyl)propionate 1-[2-(n-octadecylthio)ethyloxy]-3-n-octadecylthio-2-propyl 3-(3-methyl-5-tert-butyl-4-hydroxyphenyl)-propionate 1,3-bis(n-hexadecylthio)-2-propyl 3-(2-methyl-5-tert-butyl-4-hydroxyphenyl)propionate 1-n-octadecyloxy-3-n-octadecylthio-2-propyl 3,5-di-tert-butyl-4-hydroxybenzoate 1-n-dodecyloxy-3-n-dodecylthio-2-propyl 3,5-di-tert-butyl-4-hydroxyphenylacetate 1-n-dodecylthio-3-n-octadecyloxy-2-propyl 3-(3,5-di-tert-butyl-4-hydroxyphenyl)propionate 1-methylthio-3-n-dodecylthio-2-propyl 3-(3,5-di-tert-butyl-4-hydroxyphenyl)-2-methylpropionate 1-n-octyloxy-3-n-octadecylthio-2-propyl 3-(3-methyl-5-tert-butyl-4-hydroxyphenyl)-2,2-dimethylpropionate The following examples are illustrative of the invention, but are not meant to limit the scope of the same in any fashion. The temperatures are given in degrees centigrade unless otherwise noted.

EXAMPLE 1

1-n-Hexadecyloxy-3-n-dodecylthio-2-propyl 3-(3-methyl-5-tert-butyl-4-hydroxyphenyl)propionate a. A mixture of 13.8 grams of methyl 3-(3-methyl-5-tert-butyl-4-hydroxyphenyl-propionate, 25.0 grams of 1-n-hexadecyloxy-3-n-dodecylthio-2-propanol and 0.045 grams of lithium hydride was heated for a total of 10.5 hours at a temperature of 135°–160° C at atmospheric pressure, and then for an additional 8 hours at 150° C and 4 mm pressure. The reaction mixture was then cooled and treated with 0.5 ml of glacial acetic acid to neutralize the catalyst. The crude product obtained was clarified by filtration and then chromatographed successively through silica gel and alumina for final purification using mixtures of benzene and heptane to elute the product. The fractions of pure product were combined, stripped of solvent and dried to constant weight at 125° C and 0.3 mm Hg pressure. The product ester was obtained as a colorless liquid (Compound 1).

Calcd for $C_{45}H_{82}O_4S$: C, 75.15; H, 11.49; S, 4.46.
Found: C, 75.10; H, 11.61; S, 4.44.

EXAMPLE 2

1-n-Dodecyloxy-3-n-dodecylthio-2-propyl 3-(3-methyl-5-tert-butyl-4-hydroxyphenyl)propionate a. When an equivalent amount of 1-n-dodecyloxy-3-n-dodecylthio-2-propanol was substituted for the 1-n-hexadecyloxy-3-n-dodecylthio-2-propanol in Example 1, the above-named product ester was obtained as a colorless oil. (Compound 2)

Calcd for: $C_{41}H_{74}O_4S$: C, 74.25; H, 11.27; S, 4.83.
Found: C, 74.54; H, 11.47; S, 5.02 b. Preparation of n-dodecyl glycidyl ether and 1-n-dodecyloxy-3-n-dodecylthio-2-propanol To a flask fitted with a vacuum azeotropic distillation collector was charged 186.3 grams (1.0 mole) of n-dodecanol and 323.8 grams (3.49 moles) of epichlorohydrin. To the stirred reaction mixture was then added 2.45 grams (22.4 millimoles) of tetramethylammonium chloride catalyst. The resulting mixture was heated to 40°–50° C under water aspirator vacuum and 88 grams (1.1 mole) of a 50.9% aqueous solution of sodium hydroxide was added over a 2-hour period. The distillate, which consisted of a mixture of water and epichlorohydrin, was collected over a 5-hour period until no more water distilled off. The reaction mixture was cooled and found by VPC to consist primarily of the desired glycidyl ether.

The crude product was further purified by treatment with 15 grams of filtercel. The mixture was filtered and the solid residue washed once with 120 ml of epichlorohydrin. The clear yellow filtrate was then extracted with a solution consisting of 50 ml of saturated sodium sulfate, 50 ml of 10% (W/V) sodium dihydrogen phosphate and 100 ml of ethanol. The aqueous layer was discarded and the organic layer stripped of volatile on a roto-film evaporator first at water-aspirator pressure and finally under high vacuum till no more epichlorohydrin remained. The desired glycidyl ether was obtained containing only small amount of unreacted n-dodecanol.

50.0 grams (0.21 mole) of n-dodecyl glycidyl ether and 41.7 grams (0.21 mole) of n-dodecyl mercaptan were mixed under nitrogen. To this mixture was added dropwise with stirring and cooling 16.3 grams (0.21 mole) of 50.9% aqueous sodium hydroxide solution. The reaction was very exothermic. Stirring was continued for 3 hours and the reaction mixture turned into a solid mass. The solid crude product was washed with 500 ml of water and vacuum dried to give an off-white solid. The substituted isopropanol was further purified by recrystallization from ethanol to give a white solid with a melting point of 39°–43° C.

EXAMPLE 3

1,3-Bis(n-dodecylthio)-2-propyl 3-(3-methyl-5-tert-butyl-4-hydroxyphenyl)propionate a. A mixture of 20.5 grams of methyl 3-(3-methyl-5-tert-butyl-4-hydroxyphenyl)propionate, 34.1 grams of 1,3-bis(n-dodecylthio)-2-propanol and 0.059 grams of lithium hydride was heated at 120°–150° C for 12.5 hours at atmospheric pressure, and then for an additional 3 hours at 150° C and 0.1 mm pressure. The reaction mixture was then cooled and treated with 0.5 gram of glacial acetic acid to neutralize the catalyst. The crude product was purified by chromatography to give the product ester as a water-white oil which was dried to constant weight at 100° C and 0.2 mm pressure (Compound 3).

Calcd for $C_{41}H_{74}O_3S_2$: C, 72.50; H, 10.98; S, 9.44.
Found: C, 72.57; H, 11.04; S, 9.48.

b. Preparation of 1,3-bis(n-dodecylthio)-2-propanol

A solution of 137.3 grams (2.1 moles) of 85.8% potassium hydroxide was prepared in a mixture of 200 ml of water and 200 ml of ethanol with cooling. To the stirred solution was added dropwise over a 30-minute period 404.8 grams (2.0 moles) of n-dodecyl mercaptan with continued cooling. To the resulting gel was added 92.5 grams (1.0 mole) of epichlorohydrin at 0°–5° C and stirring was continued for 5 hours at this temperature. The resulting product was collected by filtration and washed with water until neutral. The product may be further washed or recrystallized from methanol. The substituted isopropanol was dried and had a melting point of 50°–55° C.

EXAMPLE 4

1,3-Bis(n-dodecylthio)-2-propyl 3-(2,3-dimethyl-5-tert-butyl-4-hydroxyphenyl)-propionate When an equivalent amount of 1,3-bis(n-dodecylthio)-2-propanol was substituted for 1-n-hexadecyloxy-3-n-dodecylthio-2-propanol and an equivalent amount of methyl 3-(2,3-dimethyl-5-tert-butyl-4-hydroxyphenyl)-propionate substituted for methyl 3-(3-methyl-5-tert-butyl-4-hydroxyphenyl)propionate in Example 1, the above-named ester was obtained as a viscous oil. (Compound 4)

Calcd for $C_{46}H_{76}O_3S_2$: C, 72.76; H. 11.07; S, 9.25.
Found: C, 73.01; H, 11.27; S, 9.45.

EXAMPLE 5

1,3-Bis(n-dodecylthio)-2-propyl 3-(3,5-di-tert-butyl-4-hydroxyphenyl)propionate When an equivalent amount of methyl 3-(3,5-di-tert-butyl-4-hydroxyphenyl)propionate was substituted for methyl 3-(3-methyl-5-tert-butyl-4-hydroxyphenyl)propionate in Example 1, the above-named ester was obtained as a light yellow oil. (Compound 5)

Calcd for $C_{44}H_{80}O_3S_2$: C, 73.27; H, 11.18; S, 8.89.
Found: C, 73.21; H, 11.42; S, 8.90.

EXAMPLE 6

1,3-Bis(n-dodecylthio)-2-propyl, 3,5-di-tert-butyl-4-hydroxyphenylacetate

If an equivalent amount of methyl 3,5-di-tert-butyl-4-hydroxyphenylacetate was substituted for methyl 3-(3-methyl-5-tert-butyl-4-hydroxyphenyl)propionate in Example 1, the above named ester was obtained as a pale yellow liquid. (Compound 6)

Calcd for $C_{43}H_{78}O_{3/S2}$: C, 73.03; H, 11.12; S, 9.07.
Found: C, 72.99; H, 11.61; S, 9.07.

EXAMPLE 7

Unstabilized polypropylene powder (Hercules Profax 6501) was thoroughly blended with 0.2% by weight of the indicated stabilizer compound. Also prepared were samples of polypropylene containing 0.1% by weight of the same stabilizer and 0.3% by weight of distearyl β-thiodipropionate (DSTDP). The blended materials were then milled on a two-roll mill at 182° C for 10 minutes after which time the stabilized polypropylene was sheeted from the mill and allowed to cool.

The milled polypropylene sheets were then cut into pieces and pressed for 7 minutes on a hydraulic press at 218° C and 275 psi (19.25 Kg/cm²) pressure. The resulting plaques of 25 mil (0.635 mm) thickness were tested for resistance to accelerated aging in a forced draft oven at 150° C. When the plaques showed the first signs of decomposition (eg. cracking of brown edges) they were considered to have failed. The results are shown in Table I below.

Table I

| Oven Aging of Polypropylene Plaques | |
|---|---|
| Percent Stabilizer | Hours to Failure |
| Unstabilized Polypropylene | 3 |
| 0.3% DSTDP only | 100 |
| 0.2% Compound 1 | 1640 |
| 0.1% Compound 1 + 0.3% DSTDP | 2610 |
| 0.2% Compound 2 | 1590 |
| 0.1% Compound 2 + 0.3% DSTDP | 2400 |
| 0.2% Compound 3 | 1450 |
| 0.1% Compound 3 + 0.3% DSTDP | 2000 |
| 0.2% Compound 4 | 1285 |
| 0.1% Compound 4 + 0.3% DSTDP | 2095 |
| 0.2% Compound 5 | 965 |
| 0.1% Compound 5 + 0.3% DSTDP | 1160 |
| 0.2% Compound 6 | 980 |
| 0.1% Compound 6 + 0.3% DSTDP | 1155 |
| 0.5% 2-(n-octadecylthio)ethyl 3.5-di-tert-butyl-4-hydroxy-phenylacetate (Example 1, U.S. Pat. No. 3,285,855) | 1000 |
| 0.5% 2-(n-octadecylthio)ethyl 3-(3,5-di-tert-butyl-4-hydroxyphenyl)propionate (Example 2 U.S. Pat. No. 3,285,855) | |
| 0.5% 2-(n-octadecylthio)ethyl 3,5-di tert-butyl-4-hydroxybenzoate (Example 3, U.S. Pat. No. 3,285,855) | 740 |
| 0.5% β-thiodiethylene bis-(3,5-di-tert-butyl-4-hydroxyphenylacetate) | 460 |
| 0.5% β-thiodiethylene bis-[3-(3,5-di-tert-butyl-4-hydroxyphenyl)propionate] | 1350 |
| 0.5% oxydiethylene bis-[3-(3,5-di-tert-butyl-4-hydroxyphenyl)propionate] | 1000 |
| 0.5% n-octadecyl 3-(3,5-di-tert-butyl-4-hydroxyphenyl)propionate (Example 4, U.S. Pat. No. 3,285,855) | 630 |
| 0.5% pentaerythritol tetrakis[3-(3,5-di-tert-butyl-4-hydroxyphenyl)-propionate] (Example 6, U.S. Pat. No. 3,285,855) | 1470 |
| 0.3% same stabilizer (Example 5, U.S. Pat. No. 3,758,549) | 1170 |
| 0.1% same stabilizer + 0.5% dilauryl β-thiodipropionate (Example 6, U.S. Pat. No. 3,285,855) | 975 |
| 0.5% 1,2-propylene bis[3-(3,5-di-tert-butyl-4-hydroxyphenyl)propionate] (Example 7, U.S. Pat. No. 3,285,855) | 780 |
| 0.5% ethylene bis(3,5-di-tert-butyl-4-hydroxyphenylacetate) | 475 |
| 0.5% ethylene bis[3-(3,5-di-tert-butyl-4-hydroxyphenyl)propionate] | 820 |
| 0.5% 2,2-dimethylpropylene bis[3-(3,5-di-tert-butyl-4-hydroxyphenyl)-propionate] | 510 |
| 0.5% 1,1,1-butanetriyl tris[3-(3,5-di-tert-butyl-4-hydroxyphenyl)-propionate] | 1750 |
| 0.2% 2,4,4-trimethylhexylene (70%) + 2,2,4-trimethylhexylene (30%) bis[3-(3,5-di-tert-butyl-4-hydroxyphenyl)propionate] (Example 5, U.S. Pat. No. 3,779,945) [40 mil(1 mm) thick films tested] | 936 |
| 0.1% above mixed ester stabilizer + 0.3% dilauryl β-thiodipropionate [40 mil (1 mm) thick films tested] | 1080 |

Although the esters of this invention are very effective in the absence of a thio ester co-stabilizer, they exhibit outstanding effectiveness in the presence of such co-stabilizers.

The esters of this invention at the 0.2% by weight concentration are more effective in nearly all cases than the comparative esters listed above and tested at the 0.5% concentration level and in all cases based on molar concentration of the hindered phenol moiety as seen in Example 7.

The esters of this invention at 0.2% concentration are much more effective than the best 2-(n-octadecylthio) ethyl esters described in U.S. Pat. No. 3,285,855 tested at 0.5% concentration in polypropylene. The esters of this invention at 40% of the concentration of the prior art stabilizers exhibit superior performance.

In comparison with the liquid mixed esters (Example 5, U.S. Pat. No. 3,779,945) thinner films (25 mil vs 40 mil) were used with the instant esters and still they exhibited superior stabilization effectiveness compared to the liquid mixed esters, particularly so in the presence of a thio ester co-stabilizer.

EXAMPLE 8

Test specimens were prepared exactly as described in Example 7 except that the stabilized polypropylene contained 0.2% by weight of the various esters of this invention and 0.5% by weight of 2-(2-hydroxy-3,5-di-tert-butylphenyl)-5-chloro-2H-benzotriazole as a co-stabilizer. Results of accelerrated aging tests in a forced draft oven at 150° C are shown in Table II below Table II

| Compound Number (plus co-stabilizer) | Oven Aging at 150° C Hours to Failure |
|---|---|
| Unstabilized Polypropylene | 3 |
| 2 | 1580 |

Table II-continued

| Compound Number (plus co-stabilizer) | Oven Aging at 150° C Hours to Failure |
|---|---|
| 2 | 1590 |
| 3 | 1095 |
| 4 | 1170 |
| 5 | 920 |
| 6 | 905 |

EXAMPLE 9

Test specimens were prepared exactly as those described in Example 7 except that the milled polypropylene sheets were cut into pieces and pressed for 3 minutes on a hydraulic press at 218° C and 275 psi (19.25 Kg/cm$^2$) pressure. The resulting sheet of 5 mil (0.127 mm) thickness was tested in a fluorescent sunlight black light environment with the development of carbonyl absorption in the infrared spectrum at the 585 millimicron wavelength being the measure of stabilization protection afforded by the stabilizers present in the polypropylene. Failure was taken as the hours required to cause the carbonyl absorption to reach a value of 0.5. Such a value correlates with the reduction of physical properties of the polypropylene pellicle to unacceptable levels. The results are set out in Table III.

Table III

| Compound No (Plus Co-stabilizer) | Fluorescent Sunlight Black Light Test Hours to Failure (0.5 Carbonyl Absorption) |
|---|---|
| Unstabilized Polypropylene | 225 |
| 1 | 670 |
| 2 | 670 |
| 3 | 935, 635 |
| 4 | 615 |
| 5 | >1230 |
| 6 | 1490 |

EXAMPLE 10

Pellets (500 g) of unstabilized nylon-6,6 (Zytel 101, DuPont) are placed in a Kitchen Aid Mixer. With mixing a solution of 0.5% (based on the weight of nylon) of 1,3-bis(n-octadecylthio)-2-propyl 3-(5-t-butyl-2,3-diethyl-4-hydroxyphenyl)propionate in 20 ml of methylene chloride is added slowly. Sodium hypophosphite (0.5 gm 0.14) is dissolved in 20 ml of water and added slowly with mixing to the nylon pellets after the antioxidant solution has been added and most of the methylene chloride has evaporated. The stabilized pellets are dried at 80° C at <<1 mm Hg. for 4 hours.

The polyamide formulation is extruded at 600° F (315.6° C) through at ¼ inch (0.635 cm) die into a rod which is water cooled and chopped into pellets. A ¾ inch (1.905 cm) Brabender extruder, equipped with a nylon screw, is used. The pellets are dried at 80° C at <mm for 4 hours.

The dried pellets are compression molded into 5 mil (0.127 mm) thick film by pressing at 290° C for 4 minutes at 6000 psi (57.75 Kg/cm$^2$). The films are oven aged at 150° C in a forced draft oven and samples are removed periodically. The specific viscosity of the samples are determined using a 1% formic acid solution at 25° C. The sample stabilized with the above noted stabilizer required longer aging time to reduce its viscosity by one-half than the unstabilized sample.

EXAMPLE 11

Unstabilized high impact polystyrene resin is dry blended with 0.01% by weight of the resin of 1-n-octadecyloxy-3-n-hexadecylthio-2-propyl-5-t-butyl-2,3-dimethyl-4-hydroxy-phenylacetate. The resin is then extrusion compounded on a 1 inch (2.54 cm) 24/1=L/D extruder, melt temperature 500° F (260° C) and pressed for 7 minutes at a temperature of 163° C and a pressure of 2000 psi (140 Kg/cm$^2$) into a sheet of uniform thickness of 100 mil (2.54 mm). The sheets are then cut into plaques of 2 inch × 2 inch (5.08 cm × 5.08 cm.). The plaques are then oven aged at 80° C and color measurements made periodically using a Hunter Color Difference Meter Model D25. The polystyrene samples stabilized with the above stabilizer develops the undersirable yellow disoloration substantially later than the time that such discoloration occured in the unstablized samples.

EXAMPLE 12

Unstabilized linear polyethylene (HiFax 4401) is solvent blended in methylene chloride with 0.2 by weight of the substrate of 1-n-hexadecyloxy-3n-dodecylthio-2-propyl-3-(3-methyl-5-tert-octyl-4-hydroxyphenyl)propionate and then vacuum dried. The resin is then extruded at 450° F (232.2° C) using a ¾ inch (1.905 cm) extruder having a 24:1 L/D ratio. The melt flow rate of a sample of the resin is determined after each extrusion according to ASTM test D-1238. Polyethylene stabilized with above compound is found to undergo less change in the melt flow rate than the unstabilized polyethylene.

EXAMPLE 13

A quantity of SBR emulsion containing 100 g of rubber (500 ml of a 20% SBR emulsion obtained commercially from Texas U.S as Synpol 1500) previously stored under nitrogen, is placed in a beaker and stirred vigorously. The pH of the emulsion is adjusted to 10.5 with a 0.5N NaOH solution.

To the emulsion is added 50 ml of 25% NaCl solution. A 6% NaCl solution adjusted with hydrochloric acid to a pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for ½ hour.

The coagulated rubber is isolated by filtration through cheese cloth, and rinsed with distilled water. After three subsequent washings with fresh distilled water, the coagulated rubber is dried, first at 25 mm Hg and finally to constant weight under high vacuum (< 1 mm) at 40° to 45° C.

The dried rubber (25 g) is heated under nitrogen at 125° C in a Brabender mixer and to this is added with mixing 0.1% of 1,3-(n-dodecylthio)-2-propyl-3-methyl-5-tert-amyl-4-hydroxyphenylacetate by weight.

Portions of the rubber are oven aged at 100° C. At various intervals gel content is determined on the rubber. The rubber stabilized with the above compound shows much less gel formation than the unstabilized sample.

EXAMPLE 14

To 50 g of polyacetal resin containing 0.1% of an acid scavenger, dicyandiamide, is added 0.2% by weight of 1-n-dodecyloxy-3-n-octadecylthio-2-propyl-5-t-octyl-2,3-dimethyl-4-hydroxyphenlacetate, and milled for 7 minutes at 200° C in a Barbender Plastirecorder. The milled formulation is subsequently pressed into a 40 mil (1.016 mm) sheet at 215° C at 350 psi (24.5 Kg/cm$^2$) for 90 seconds then cooled quickly in a cold press at 350 psi (24.5 Kg/cm$^2$). The stabilized sheets are then remoled for 2 minutes at contact pressure and for 3 minutes at 300 psi (21 Kg/cm$^2$9 at 215° C to give plaques 1.5 inch × 1.5 inch × 125 mil (3.81 cm × 5.715 cm × 3.175 mm.). The plaques are aged in the oven at 60° C and the weight loss of the specimen is determined periodically until a 4% weight loss is reached. The stabilized sample takes a much longer time to reach this 4% weight loss than does the unstabilized sample.

EXAMPLE 15

Unstabilized, thoroughly dried polyethylene terephthalate chips are dry blended with 1.0% by weight of 1-n-octyloxy-3-n-octadecylthio-2-propyl-3-(5-tert-butyl-2,3 -dimethyl-4-hydroxyphenyl)propionate. 60/10 denier multifilament is melt spun at a melt temperature of 290° C and cold oriented 3 to 1. The oriented fibers are wound into skeins and oven aged at 140° C. The stabilized material exhibits greater retention of tensile strength after 24 hours than the unstabilized material.

EXAMPLE 16

A stabilized high temperature lubricating oil is prepared by incorporating 0.05% by weight of 1,3-bis(-cyclohexylthio)-2-propyl 3-(5-t-butyl-2,3-dimethyl-4-hydroxyphenyl)-propionate to the lubricant which comprises diisoamyl adipate. The stabilized composition is compared with the unstabilized lubricant by heating at 175° C in the presence of air and metallic catalysts according to the test method described in Military Specification Mil-I-7808c. After 72 hours, the blank containing no stabilizer contains more sludge and has a greater viscosity than the stabilized lubricant.

What is claimed is:

1. A stabilized composition of matter comprising a polyolefin and from 0.01 to 5% by weight of a stabilizing compound of the formula

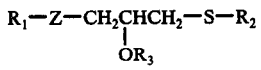

wherein
R$_1$ and R$_2$ are each independently alkyl of 1 to 30 carbon atoms, cycloaklyl of 5 to 12 carbon atoms, alkylthioethyl of 4 to 27 atoms in the chain or alkyl polyoxyalkylene of 4 to 27 atoms in the chain having the general structure R°(OC$_n$H$_{2n}$)$_h$ or R°(OCH$_2$CHR')$_h$ where R° is alkyl of 1 to 18 carbon atoms, n is 2 to 4, R' is hydrogen, methyl or ethyl and h is 1 to 3,
Z is oxygen or sulfur,
R$_3$ is the group

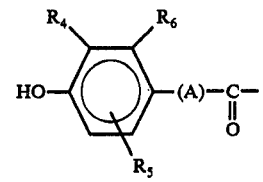

R$_4$ is hydrogen, alkyl of 1 to 8 carbon atoms, cycloakyl of 5 to 6 carbon atoms or α-methylbenzyl,
R$_5$ is alkyl of 1 to 8 carbon atoms or cycloalkyl of 5 to 6 carbon atoms,
R$_6$ is hydrogen or lower alkyl of 1 to 4 carbon atoms, or R$_4$ and R$_6$ together are a butylene chain which, together with the phenyl ring, form a tetrahydronaphthyl group, and provided when R$_4$ is hydrogen, R$_6$ is alkyl and R$_5$ is located on the carbon atom ortho to the hydroxyl group, and
A is a covalent carbon bond or a straight or branched lower alkylene having 1 to 8 carbon atoms.

2. A composition according to claim 1 wherein the stabilizing compound R$_1$ and R$_2$ are each independently alkyl of 1 to 18 carbon atoms, R$_4$ is alkyl of 1 to 4 carbon atoms, R$_5$ is branched alkyl of 3 to 8 carbon atoms, R$_6$ is hydrogen or lower alkyl of 1 to 3 carbon atoms, and A is a straight chain alkylene of 1 to 3 carbon atoms.

3. A composition according to claim 1 wherein the stabilizing compound R$_1$ and R$_2$ are each independently alkyl of 8 to 18 carbon atoms, R$_4$ is methyl or tert-butyl, R$_5$ is tert-butyl, R$_6$ is hydrogen or methyl, and A is methylene or ethylene.

4. A composition according to claim 1 wherein the stabilizing compound is 1-n-dodecyloxy-3-n-dodecylthio-2-propyl 3-(3-methyl-5-tert-butyl-4-hydroxyphenyl)propionate.

5. A composition according to claim 1 wherein the stabilizing compound is 1,3-bis(n-dodecylthio)-2-propyl 3-(3-methyl-5-tert-butyl-4-hydroxyphenyl)propionate.

6. A composition according to claim 1 wherein the stabilizing compound is 1,3-bis(n-dodecylthio)-2-propyl 3-(2,3-dimethyl-5-tert-butyl-4-hydroxyphenyl)propionate.

7. A composition according to claim 1 wherein the stabilizing compound is 1,3-bis(n-dodecylthio)-2-propyl 3-(3,5-di-tert-butyl-4-hydroxyphenyl)propionte.

8. A composition according to claim 1 wherein the stabilizing compound is 1,3-bis(n-dodecylthio)-2-propyl 3,5-di-tert-butyl-4-hydroxyphenylacetate.

9. A composition of claim 1 containing additionally from 0 to 2% by weight of a thio co-stabilizer having the formula

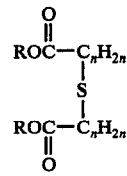

wherein R is alkyl of 6 to 24 carbon atoms and n is 1 to 6.

10. A composition of claim 1 containing additionally from 0 to 5% by weight of a light stabilizer.

11. A composition of claim 1 wherein the stabilizing compound is 1-n-hexadecyloxy-3-n-dodecylthio-2-propyl 3-(3-methyl-5-tert-butyl-4-hydroxyphenyl)propionate.

12. A composition of claim 1 wherein the organic material is polypropylene.

* * * * *